Sept. 9, 1952     A. C. ELLES ET AL     2,610,049
BIT
Filed Oct. 18, 1949
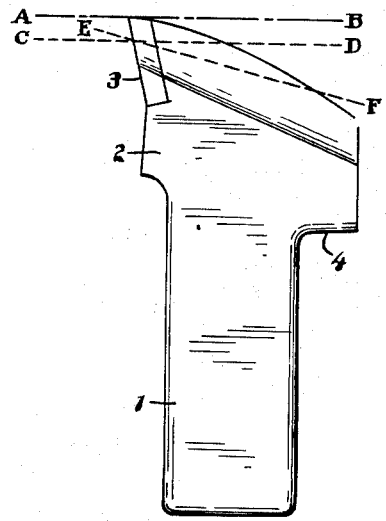
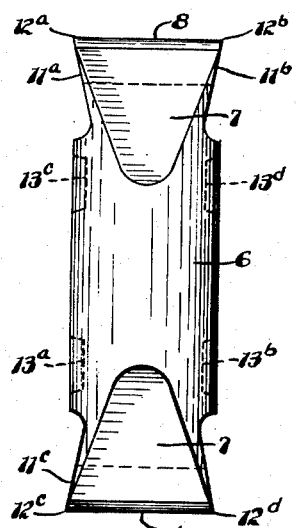
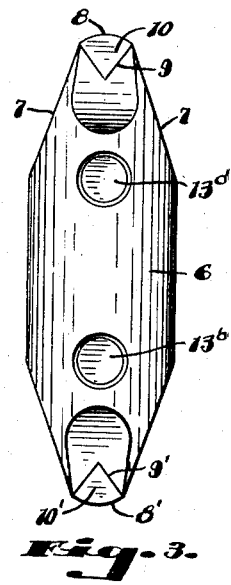
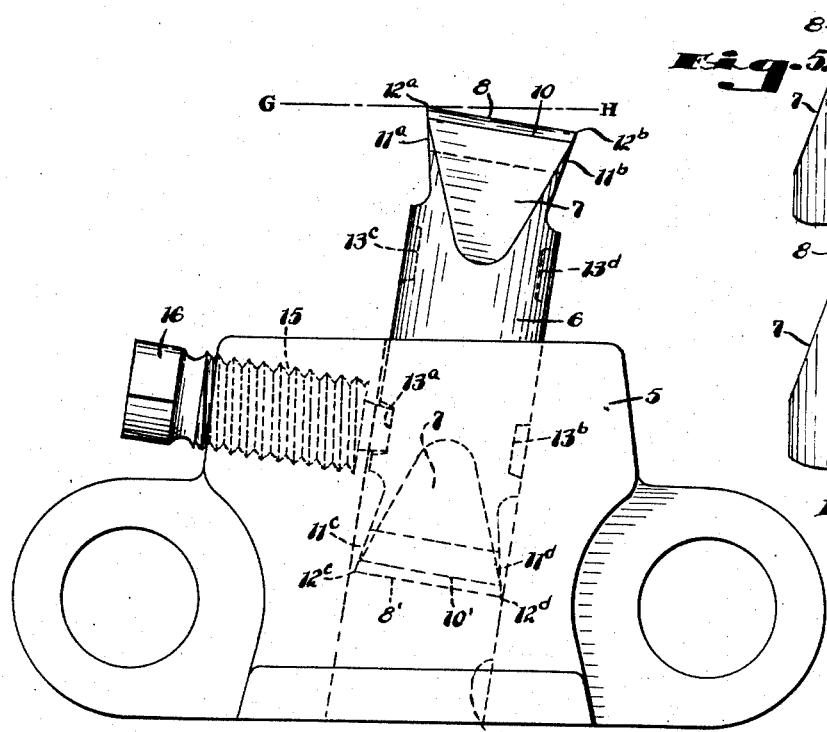
INVENTOR.
Frank L. Fulke
and
Albert Charles Elles Patented Sept. 9, 1952

2,610,049

UNITED STATES PATENT OFFICE 2,610,049

BIT

Albert Charles Elles and Frank L. Fulke,
Terre Haute, Ind.

Application October 18, 1949, Serial No. 122,034

2 Claims. (Cl. 262—33)

Our invention relates to bits for cutting coal or other substances, and particularly to bits locked in links of chains adaptable to circulate about a closed orbit in a cutterbar.

A principal object of our invention is to provide an economically usable bit having a plurality of cutting elements of extremely hard metal securely bonded to a body of tough steel whereby each hard metal element may successively be employed to resist the abrasion encountered in the cutting operation.

A further object is to provide successively usable multiple cutting points of hard metal on a tough steel bit body at far less cost than if a separate bit body had to be discarded each time one point wore out, any such a bit body being of very substantial weight and cost whether one or more cutting points are available upon it.

A further object is to provide for economy in the dressing or grinding of the multiple hard metal cutting points on our bit body as compared with dressing single pointed bit bodies.

A further object is to lessen the labor wasted in changing dull points in the cutter chain and in handling dull bits out of the mine, through the redressing operation and then redistributing them through the mine for use on the various mining machines.

A further object is to lessen the cost of the manufacture of our bits so they may be sold and used at far less cost per hard metal cutting point provided.

A further object is to provide for maximum cutting power of our bit as regards abrasion and wear, and at the same time provide the strongest support for the hard metal cutting point of the bit to resist breakage under heavy impact shocks encountered in cutting when hard impurities are found in the coal.

A further object is to provide longer life for each of the cutting points by providing heels of such character behind the points that extreme abrasion in cutting will not entail so rapid shortening of the bit through the necessary successive regrinds to resharpen them.

Other objects and a full understanding of the invention may be apparent from the following description and claims, taken in conjunction with the accompanying drawings, in which:

Fig. 1 is a side elevational view of a conventionally employed bit having a hard metal cutting element secured to it;

Fig. 2 is a side elevational view of a preferred form of our invention in which four successively usable brittle hard metal cutting elements are carried by a single tough steel body portion;

Fig. 3 is a front elevational view of the structure shown in Fig. 2;

Fig. 4 is a side elevational view of a bit structure similar to that of Fig. 2 showing a preferred method of securing the bit in a chain link;

Fig. 5 is a fragmentary front elevational view of a modification of the bit structure shown in Fig. 2;

Fig. 6 is a fragmentary front elevational view of a further modification of the structure shown in Fig. 2.

In the undercutting of coal with a mining machine an endless chain weighing some 400 pounds is circulated about a cutterbar by a 50 horsepower motor at about 600 feet per minute speed. When the bits carried by the chain engage hard impurities extremely severe impacts come upon the bits tending to break them or snap off any kind of brittle hard metal tips applied to them. Often these impurities are extremely abrasive so that even hard metal points do not very long withstand the wear. Whenever a mining machine has to stop for changing bits the delay is extremely expensive. Bringing out worn bits from the cutting machines to be dressed in the mine shop and redistributing them to the various machines is also expensive. Frequent and extensive regrinding of hard metal tipped bits shortens them rapidly so that not many such dressings are possible before the expensive bit is thrown away.

In our improved bit we have contrived to lessen the initial purchase cost of the bit per available hard metal point, make those hard points better adapted to resist the extreme shocks, and increase their resistance to abrasion so that less shortening of the bit will be necessitated each time it is reground, so that the regrinding cost per point may be accomplished with less time and expense, and also we have contrived the bit so that the time wasted in bit changing at the machine may be minimized.

In Fig. 1 a conventional type of regrindable bit is illustrated, having a shank 1 and a head 2 which has brazed to its forward face a hard metal plate 3 of considerable face width but little thickness. A shoulder 4 gauges the distance from chain link to bit point. Line A—B is the line of cutting, dotted line C—D shows how the bit may wear to necessitate regrind, and dotted line E—F shows how much the bit must be ground to properly sharpen it.

In Fig. 2 our novel bit has an elongated tough steel body portion 6 of cylindrical shape at its middle. Its opposite ends are beveled on both sides as at 7 from body thickness to form edges 8 and 8' parallel to each other and at right angles to the longitudinal axis of the body portion 6. Slots 9, 9' are milled into edges 8, 8' and hard metal bars 10, 10' are securely bonded to the walls of the slots preferably by flash welding, or by conventional brazing methods. Each of the two ends of each of these hard metal bars is beveled toward the axis of body 6 to form cutting faces 11a, 11b, 11c, 11d, whereby four cutting points 12a, 12b, 12c, and 12d are formed as well as the four cutting faces, and each of these cutting points and cutting faces as well as the substantial heel behind each cutting face is of hard metal. Obviously the body portion 6 of our bit may be provided at little if any cost more than the body of the conventional bit shown in Fig. 1. The cost of our completed bit with its four successively usable hard metal cutting elements would certainly be radically less, in fact only a fraction of the cost of providing four such complete bits like in Fig. 1.

When point 12a of our bit is placed in cutting position, as illustrated in Fig. 4, the edge 8 throughout its entire extension from cutting point 12a to cutting point 12b becomes a solid heel for the active cutting point 12a and all portions of this edge that could possibly be abraded, even through successive regrinds to the termination of the bit life, are of hard metal. This is quite different from the bit of Fig. 1. In that bit the hard metal plate 3 is only $\frac{1}{8}''$ to $\frac{3}{16}''$ thick and severe abrasion could rapidly reduce its height and require extensive regrinding, since the bulk of the heel area behind it which may sustain abrasion is only tough, not hard steel. Obviously under severe abrasion our bit, providing for always taking the entire abrasive effect on hard metal areas as it does, would not so rapidly lose height or require so extensive regrinding. It may however be noted here that by merely pushing edge 8 of our bit squarely against a grinding wheel we obtain the redressing of two hard metal points as cheaply as the one point of the conventional bit and would not gouge and groove the face of the expensive grinding wheel so badly.

Brittle hard metal as used in cutter bits has the ability to stand heat of 2000 degrees or more without softening while the tough alloy steel bodies of such bits start softening at relatively low heat, even 300 degrees. Therefore in the conventional bit of Fig. 1 the steel behind the relatively thin hard metal plate 3 may under severe abrasion soften and not only abrade more easily but actually yield under compressive impact and fail to rigidly support the hard plate 3 against cutting shocks, and this could not occur with our improved bit since all parts of our bit that may be abrasively engaged are of hard metal.

In Fig. 4 link 5 is bored to form a socket 14 for our bit and the axis of this bore leans away from the direction of chain travel. The cylindrical body portion 6 of our bit closely fits this bore. A bore 15 in the link is threaded to receive a set screw 16 with its nose protruding into socket 14. Formed on the body of our bit are four similar small holding sockets 13a, 13b, 13c, and 13d, and these sockets are radially disposed about the midpoint of the bit body, whereby the nose of screw 16 may be consecutively screwed into socket 13a to position bit point 12a for cutting, into 13b to position point 12b, into 13c to position 12c, and into 13d to position point 12d. It will be noted that a slight turning of screw 16 will permit quickly rotating point 12a out of cutting position and locking point 12b into cutting position without even removing the bit from its socket. Then successive points 12c and 12d may be rapidly positioned with only one removal of the bit from its socket to accomplish the positioning of all four cutting points successively. This saves extremely valuable time and an additional amount of time is saved by the operator not having to reach for and procure a separate fresh bit from a bit container and deposit a worn bit in a container every time a fresh cutting point is required. When bits require changing while the cutterbar is still under the coal the valuable time saved by our bit is greatly increased.

In Fig. 4 it will be noted that when in cutting position the edge 8 of our bit is at a very acute angle to the line of cutting G—H and at right angles to the longitudinal axis of the bit body 6, and that the edge 8 forms an included angle with cutting face 11a far greater than its acute angle with the line of cutting, which provides an extremely strong heel behind cutting face 11a and also provides for a considerable length of this hard metal heel being in position to resist severe abrasion.

It will be noted that the holding sockets on the bit body provide for literally hanging the bit upon the nose of the screw whereby all forces tending to drive the bit inwardly, or to swivel it, or to throw it out of the socket as when the link whips around the cutterhead are securely guarded against, yet minimum time is required to change cutting points.

In Fig. 3 illustrating our preferred structure it will be seen that the slot 9 milled into the edge 8 of the bit has angular walls converging toward the bottom of the slot and the extrusion-formed hard metal bar 10 of sintered tungsten carbide has two sides similarly converging and an exposed arcuate upper side extending outward of slot 9. In this manner we secure utmost effectively usable hard abrasive surface with least weight of the extremely expensive hard metal, secure maximum area of the bond between the hard metal and the bit body, secure a very high degree of effective shielding of the bit body against destructive abrasive contact, and provide greatest strength to the walls of the bit body slot for resisting the severe lateral shocks against the bit encountered in cutting.

It may however be more economical and under some cutting conditions even more efficient to provide hard metal cutting elements for our tough steel bit body in other forms than the preferred form illustrated in Fig. 3, some such modifications being shown in Figs. 5 and 6.

In Fig. 5 the hard metal bar 17 is cylindrical in form and may be segmented from readily obtainable selective grades of hard metal welding rods such as compositions of cobalt, tungsten, and chromium, which while not possessing the extreme resistance to abrasion that sintered tungsten carbide does, may have higher impact resistance. This bar may be preferably flash welded into groove 18 or it may be brazed. However, if brazing is employed a rectangular form of hard metal bar may be preferable as in Fig. 6 such as bar 19 deeply set into rectangular slot 20 which will provide greater bonding area and better resistance to severe shocks.

It will be noted that in all the illustrated embodiments of our invention our novel bit has a tough steel body terminating in an active cutting end which provides a pair of complete hard metal cutting elements each having a hard metal cutting point and a hard metal cutting face inclining toward the body axis, and a hard metal heel, said heel being a portion of an edge common to and connecting said points, said edge being at right angles to the axis of said body and at an acute angle with the line of cutting, and that all elements of the bit are symmetrical with respect to the axis of the body in any plane including said axis. Other modifications may however be made without departing from the scope of the appended claims.

We claim:

1. A bit for coal cutting chains comprising an elongated tough steel body terminating in an edge disposed at right angles to said body, a groove of V cross section formed longitudinally in said edge and extending from end to end thereof, and a continuous bar of hard metal bonded into said groove, the cross section of said bar conforming to said groove but having an arcuate projection beyond the wings of said groove, each opposite end of said bar being exposed to provide a complete hard metal cutting element comprising a cutting point, a cutting face, and a solid heel, said cutting faces being alternatively usable and each said cutting face inclining toward the axis of said tough steel body.

2. A bit for coal cutting chain comprising an elongated tough steel body, cylindrical throughout a medial portion of its length and formed to provide, at an end thereof, a continuous socket located upon an axis perpendicular to the axis of said body, a continuous bar of hard metal bonded into said socket and extending from end to end thereof, each end of said bar being exposed to define a hard metal cutting face backed by the body of said bar, said cutting faces flaring outwardly from the axis of said body, all elements of said bit being symmetrical with respect to said body axis in any plane including the said axis.

ALBERT CHARLES ELLES.
FRANK L. FULKE.

REFERENCES CITED

The following references are of record in the file of this patent:

UNITED STATES PATENTS

| Number | Name | Date |
|---|---|---|
| 905,876 | Hess | Dec. 8, 1908 |
| 1,927,818 | Brodersen | Sept. 26, 1933 |
| 1,952,002 | Trembour | Mar. 20, 1934 |
| 2,123,213 | Simmons | July 12, 1938 |
| 2,168,060 | Catland | Aug. 1, 1939 |
| 2,244,617 | Hannum | June 3, 1941 |
| 2,449,288 | Fulke | Sept. 14, 1948 |

FOREIGN PATENTS

| Number | Country | Date |
|---|---|---|
| 392,773 | Great Britain | May 25, 1933 |
| 549,892 | Great Britain | Dec. 11, 1942 |